United States Patent
Sah et al.

(10) Patent No.: US 8,068,948 B2
(45) Date of Patent: Nov. 29, 2011

(54) METHOD FOR CONTROLLING MULTIPLE EVT SHIFTS IN A MULTI-MODE HYBRID TRANSMISSION

(75) Inventors: Jy-Jen F. Sah, West Bloomfield, MI (US); Lawrence A. Kaminsky, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 432 days.

(21) Appl. No.: 12/474,467

(22) Filed: May 29, 2009

(65) Prior Publication Data

US 2010/0305791 A1 Dec. 2, 2010

(51) Int. Cl.
*B60W 10/10* (2006.01)
(52) U.S. Cl. ............................................ 701/22; 701/51
(58) Field of Classification Search .................. 701/22, 701/51, 55, 56, 66, 67, 87, 88; 477/39, 3; 180/65.2, 65.8; 475/5, 276
See application file for complete search history.

(56) References Cited

U.S. PATENT DOCUMENTS

| | | | |
|---|---|---|---|
| 6,551,208 B1 | 4/2003 | Holmes et al. | |
| 7,010,406 B2 | 3/2006 | Sah et al. | |
| 7,034,481 B2 * | 4/2006 | Imai | 318/376 |
| 7,130,734 B2 | 10/2006 | Sah et al. | |
| 7,217,211 B2 | 5/2007 | Klemen et al. | |
| 7,273,435 B2 * | 9/2007 | Raghavan et al. | 475/151 |
| 7,288,041 B2 * | 10/2007 | Bucknor et al. | 475/151 |
| 7,324,885 B2 | 1/2008 | Sah et al. | |
| 7,356,398 B2 | 4/2008 | Steinmetz et al. | |
| 2007/0105678 A1 * | 5/2007 | Bucknor et al. | 475/5 |
| 2007/0276569 A1 | 11/2007 | Sah et al. | |
| 2008/0182696 A1 | 7/2008 | Sah et al. | |
| 2008/0234097 A1 | 9/2008 | Sah | |

* cited by examiner

*Primary Examiner* — Thomas Black
*Assistant Examiner* — Marthe Marc-Coleman
(74) *Attorney, Agent, or Firm* — Quinn Law Group, PLLC (57) ABSTRACT

A method of performing shifts includes determining whether a multiple-shift maneuver is needed, whether a single-staged input profile is needed, and creating the single-staged input speed profile. The profile is matched to first or second multiple-shift patterns, neither of which utilizes fixed-gear propulsion. The patterns utilize a quasi-asynchronous transitional shift event and an electric torque converter transitional shift event. The quasi-asynchronous event induces controlled slip to an offgoing clutch while providing reaction torque from the electric machines, and offloads torque from the offgoing clutch proportionally to reaction torque. The oncoming clutch begins slipping-engagement prior to completing offloading of the offgoing clutch. At least one of the offgoing and oncoming clutches has non-zero slip speed throughout the quasi-asynchronous event. The electric torque converter event utilizes oncoming and offgoing clutches, completely offloads the offgoing clutch while controlling output torque with the electric machines, and synchronizes and engages the oncoming clutch.

7 Claims, 6 Drawing Sheets

Figure 1

| Transmission State | C4 | C3 | C2 | C1 |
|---|---|---|---|---|
| Neutral1 | Off | Off | Off | Off |
| ETC1 | Off | Off | Off | ON |
| ETC2 | Off | Off | ON | Off |
| ETC12 | Off | Off | ON | ON |
| Neutral2 | Off | ON | Off | Off |
| EVT1 | Off | ON | Off | ON |
| EVT4 | Off | ON | ON | Off |
| Park | Off | ON | ON | ON |
| Neutral3 | ON | Off | Off | Off |
| EVT2 | ON | Off | Off | ON |
| EVT3 | ON | Off | ON | Off |
| FG2 | ON | Off | ON | ON |
| Neutral4 | ON | ON | Off | Off |
| FG1 | ON | ON | Off | ON |
| FG3 | ON | ON | ON | Off |

METHOD FOR CONTROLLING MULTIPLE EVT SHIFTS IN A MULTI-MODE HYBRID TRANSMISSION

TECHNICAL FIELD

The present invention relates generally to hybrid powertrains for motorized vehicles, and hydraulic control thereof.

BACKGROUND OF THE INVENTION

Motorized vehicles include a powertrain operable to propel the vehicle and power the onboard vehicle electronics. The powertrain, or drivetrain, generally includes an engine that powers the final drive system through a multi-speed power transmission. Many vehicles are powered by a reciprocating-piston type internal combustion engine (ICE).

Hybrid vehicles utilize alternative power sources to propel the vehicle, minimizing reliance on the engine for power. A hybrid electric vehicle (HEV), for example, incorporates both electric energy and chemical energy, and converts the same into mechanical power to propel the vehicle and power the vehicle systems. The HEV generally employs one or more electric machines that operate individually or in concert with an internal combustion engine to propel the vehicle. Since hybrid vehicles can derive their power from sources other than the engine, engines in hybrid vehicles may be turned off while the vehicle is stopped or is being propelled by the alternative power source(s).

Parallel hybrid architectures are generally characterized by an internal combustion engine and one or more electric motor/generator assemblies, all of which have a direct mechanical coupling to the transmission. Parallel hybrid designs utilize combined electric motor/generators, which provide traction and may replace both the conventional starter motor and alternator. The motor/generators are electrically connected to an energy storage device (ESD). The energy storage device may be a chemical battery. A control unit is employed for regulating the electrical power interchange between the energy storage device and motor/generators, as well as the electrical power interchange between the first and second motor/generators.

Electrically-variable transmissions (EVT) provide for continuously variable speed ratios by combining features from both series and parallel hybrid powertrain architectures, and also elements of traditional, non-hybrid transmissions. EVTs may be designed to operate in both fixed-gear (FG) modes and EVT modes. When operating in a fixed-gear mode, the rotational speed of the transmission output member is a fixed ratio of the rotational speed of the input member from the engine, depending upon the selected arrangement of the differential gearing subsets. EVTs may also be configured for engine operation that is mechanically independent from the final drive.

The EVT can utilize the differential gearing to send a fraction of its transmitted power through the electric motor/generator(s) and the remainder of its power through another, parallel path that is mechanical. One form of differential gearing used is the epicyclic planetary gear arrangement. However, it is possible to design a power split transmission without planetary gears, for example, as by using bevel gears or other differential gearing.

Hydraulically-actuated torque-transmitting mechanisms, such as clutches and brakes, are selectively engageable to selectively activate the gear elements for establishing different forward and reverse speed ratios and modes between the transmission input and output shafts. The term "clutch" is used hereinafter to refer generally to torque transmitting mechanisms, including, without limitation, devices commonly referred to as clutches and brakes. Shifting from one speed ratio or mode to another may be in response to vehicle conditions and operator (driver) demands. The "speed ratio" is generally defined as the transmission input speed divided by the transmission output speed. Thus, a low gear range has a high speed ratio, and a high gear range has a relatively lower speed ratio. The different operating states of an EVT may be referred to as ranges or modes.

SUMMARY OF THE DISCLOSURE

A method of performing shifts in hybrid powertrains is provided. The powertrain is configured for operation in multiple electrically variable transmission modes (EVT) and includes an internal combustion engine, a first electric machine, and a second electric machine. The method includes determining whether a multiple-shift maneuver is needed. The multiple-shift maneuver includes shifting from an initial EVT mode to an intermediate EVT mode, and then from the intermediate EVT mode to a target EVT mode. The method determines whether a single-staged input profile is needed to execute the multiple-shift maneuver and creates the single-staged input speed profile.

The method matches the single-staged input speed profile with either a first or a second multiple-shift pattern. Both of the multiple-shift patterns are characterized by a lack of fixed-gear propulsion during the multiple-shift maneuver, including shifts from the initial EVT mode, to the intermediate EVT mode, and to the target EVT mode. The method performs one of the first and second multiple-shift patterns by utilizing both a quasi-asynchronous transitional shift event and an electric torque converter transitional shift event.

The quasi-asynchronous transitional shift event utilizes a first oncoming clutch and a first offgoing clutch, and includes inducing controlled slip to the first offgoing clutch while providing reaction torque from at least one of the electric machines. The quasi-asynchronous transitional shift event offloads torque from the first offgoing clutch in proportion to the provided reaction torque of the electric machines. The quasi-asynchronous transitional shift event begins slipping-engagement of the first oncoming clutch prior to completing offloading of the first offgoing clutch, and at least one of the first offgoing clutch and the first oncoming clutch is characterized by non-zero slip speed throughout the duration of the shift event.

The electric torque converter transitional shift event utilizes a second oncoming clutch and a second offgoing clutch, and includes completely offloading the second offgoing clutch and controlling output torque of the transmission with at least one of the electric machines. The electric torque converter transitional shift event synchronizes then engages the second oncoming clutch. The method performs one of the first and second multiple-shift patterns without utilizing or entering fixed-gear propulsion.

The above features and advantages, and other features and advantages of the present invention will be readily apparent from the following detailed description of the preferred embodiments and other modes for carrying out the present invention when taken in connection with the accompanying drawings and appended claims.

DESCRIPTION OF PREFERRED EMBODIMENTS

The claimed invention is described herein in the context of a hybrid-type vehicular powertrain having a multi-mode, multi-speed, electrically-variable, hybrid transmission, which is intended solely to offer a representative application by which the present invention may be incorporated and practiced. The claimed invention is not limited to the particular powertrain arrangement shown in the drawings. Furthermore, the hybrid powertrain illustrated herein has been greatly simplified, it being understood that further information regarding the standard operation of a hybrid powertrain, or a hybrid-type vehicle will be recognized by those having ordinary skill in the art.

Figure 1:
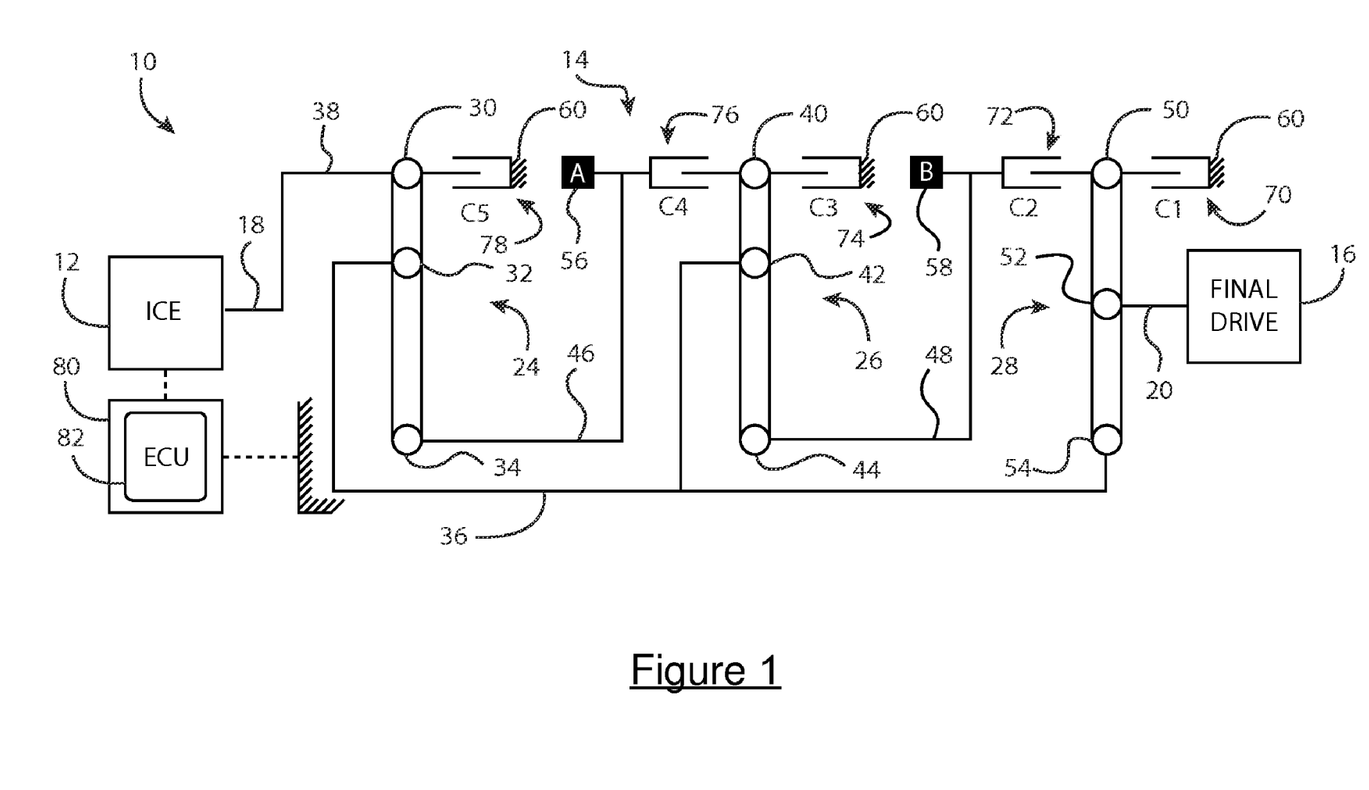
FIG. 1 is a schematic lever diagram illustration of an exemplary vehicle powertrain with a multi-mode, electrically-variable hybrid transmission in accordance with the present invention.

Referring to the drawings, wherein like reference numbers refer to like components throughout the several views, there is shown in FIG. 1 a lever diagram depiction of an exemplary vehicle powertrain system, designated generally as 10. The powertrain 10 includes a restartable engine 12 that is selectively drivingly connected to, or in power flow communication with, a final drive system 16 via a multi-mode, electrically-variable hybrid-type power transmission 14.

A lever diagram is a schematic representation of the components of a mechanical device such as an automatic transmission. Each individual lever represents a planetary gearset, wherein the three basic mechanical components of the planetary gear are each represented by a node. Therefore, a single lever contains three nodes: one for the sun gear member, one for the planet gear carrier member, and one for the ring gear member. The relative length between the nodes of each lever may be used to represent the ring-to-sun ratio of each respective gearset. These lever ratios, in turn, are used to vary the gear ratios of the transmission in order to achieve appropriate ratios and ratio progression. Mechanical couplings or interconnections between the nodes of the various planetary gear sets and other components of the transmission (such as motor/generators) are illustrated by thin, horizontal lines. Torque transmitting devices such as clutches and brakes are presented as interleaved fingers. If the device is a brake, one set of the fingers is grounded.

The transmission 14 is designed to receive at least a portion of its driving power from the engine 12, through an input member 18, for example. The transmission input member 18, which is in the nature of a shaft, may be the engine output shaft (also referred to as a "crankshaft"). Alternatively, a transient torque damper (not shown) may be implemented between the engine 12 and the input member 18 of the transmission 14. The engine 12 transfers power to the transmission 14, which distributes torque through a transmission output member or shaft 20 to drive the final drive system 16, and thereby propel the vehicle (not shown).

In the embodiment depicted in FIG. 1, the engine 12 may be any of numerous forms of petroleum-fueled prime movers, such as the reciprocating-piston type internal combustion engines, which includes spark-ignited gasoline engines and compression-ignited diesel engines. The engine 12 is readily adaptable to provide its available power to the transmission 14 at a range of operating speeds, for example, from idle, at or near 600 revolutions per minute (RPM), to over 6,000 RPM. Irrespective of the means by which the engine 12 is connected to the transmission 14, the input member 18 is connected to a differential gear set encased within the transmission 14, as explained in more detail herein.

Referring still to FIG. 1, the hybrid transmission 14 utilizes one or more differential gear arrangements, preferably in the nature of three interconnected epicyclic planetary gear sets, designated generally at 24, 26 and 28, respectively. Each gear set includes three gear members: a first, second and third member. In referring to the first, second and third gear sets in this description and in the claims, these sets may be counted "first" to "third" in any order in the drawings (e.g., left to right, right to left, etc.). Likewise, in referring to the first, second and third members of each gear set in this description and in the claims, these members may be counted or identified as "first" to "third" in any order in the drawings (e.g., top to bottom, bottom to top, etc.) for each gear set.

The first planetary gear set 24 has three gear members: a first, second and third member 30, 32 and 34; respectively. The first, second and third members correspond to the first, second and third nodes of the lever diagram shown in FIG. 1, as viewed from top to bottom. In a preferred embodiment, the first member 30 includes of an outer gear member (which may be referred to as a "ring gear") that circumscribes the third member 34, which may include of an inner gear member (which may be referred to as a "sun gear"). In this instance, the second member 32 acts as a planet carrier member. That is, a plurality of planetary gear members (which may be referred to as "pinion gears") are rotatably mounted on the second member, planet carrier 32. Each planetary gear member is meshingly engaged with both the first member, ring gear 30 and the third member, sun gear 34.

The second planetary gear set 26 also has three gear members: a first, second and third member 40, 42 and 44, respectively. In the preferred embodiment discussed above with respect to the first planetary gear set 24, the first member 40 of the second planetary gear set 26 is an outer "ring" gear member that circumscribes the third member 44, which is an inner "sun" gear member. The ring gear member 40 is coaxially aligned and rotatable with respect to the sun gear member 44. A plurality of planetary gear members are rotatably mounted on the second member 42, which acts as a planet carrier member, such that each planetary gear meshingly engages both the ring gear member 40 and the sun gear member 44.

The third planetary gear set 28, similar to the first and second gear sets 24, 26, also has first, second and third members 50, 52 and 54, respectively. In this arrangement, however, the second member 52, shown on the middle node of the lever representing the third planetary gear set 28, is the outer "ring" gear. The ring gear (second member 52) is coaxially aligned and rotatable with respect to the sun gear, third member 54. The first member 50 is the planet carrier in this particular gear set, and is shown on the top node. As such, a plurality of planetary or pinion gear members are rotatably mounted on the planet carrier, first member 50. Each of the pinion gear members is aligned to meshingly engage either the ring gear (second member 52) and an adjacent pinion gear member or the sun gear (third member 54) and an adjacent pinion gear member.

In one embodiment, the first and second planetary gear sets 24, 26 each comprise simple planetary gear sets, whereas the third planetary gear set 28 comprises a compound planetary gear set. However, each of the planet carrier members described above can be either a single-pinion (simple) carrier assembly or a double-pinion (compound) carrier assembly. Embodiments with long pinions are also possible.

The first, second and third planetary gear sets 24, 26, 28 are compounded in that the second member 32 of the first planetary gear set 24 is conjoined with (i.e., continuously connected to) the second member 42 of the second planetary gear set 26 and the third member 54 of the third planetary gear set 28, as by a central shaft 36. As such, these three gear members 32, 42, 54 are rigidly attached for common rotation.

The engine 12 is continuously connected to the first planetary gear set 24, namely first member 30, for example, through an integral hub plate 38, for common rotation therewith. The third member 34 of the first planetary gear set 24 is continuously connected, for example, by a first sleeve shaft 46, to a first motor/generator assembly 56, which is also referred to herein as "motor A". The third member 44 of the second planetary gear set 26 is continuously connected, for example, by a second sleeve shaft 48, to a second motor/generator assembly 58, also referred to herein as "motor B". The second member 52 (the ring gear) of the third planetary gear set 28 is continuously connected to transmission output member 20, for example, through an integral hub plate. The first and second sleeve shafts 46, 48 may circumscribe the central shaft 36.

A first torque transfer device 70—which is herein interchangeably referred to as clutch "C1"—selectively connects the first gear member 50 with a stationary member, represented in FIG. 1 by transmission housing 60. The second sleeve shaft 48, and thus gear member 44 and motor/generator 58, is selectively connectable to the first member 50 of the third planetary gear set 28 through the selective engagement of a second torque transfer device 72—which is herein interchangeably referred to as clutch "C2". A third torque transfer device 74—which is herein interchangeably referred to as clutch "C3"—selectively connects the first gear member 40 of the second planetary gear set 26 to the transmission housing 60. The first sleeve shaft 46, and thus third gear member 34 and first motor/generator 56, is also selectively connectable to the first member 40 of the second planetary gear set 26, through the selective engagement of a fourth torque transfer device 76—which is herein interchangeably referred to as clutch "C4".

A fifth torque transfer device 78—which is herein interchangeably referred to as clutch "C5"—selectively connects the input member 18 of engine 12 and the first gear member 30 of the first planetary gear set 24 to the transmission housing 60. Clutch C5 is an input brake clutch, which selectively locks the input member 18 when engine 12 is off. Locking input member 18 provides more reaction for regenerative braking energy. As shown below, in reference to FIG. 2, C5 is not involved in the mode/gear/neutral shifting maneuvers of transmission 14.

The first and second torque transfer devices 70, 72 (C1 and C2) may be referred to as "output clutches." The third and fourth torque transfer devices 74, 76 (C3 and C4) may be referred to as "holding clutches".

In the exemplary embodiment depicted in FIG. 1, the various torque transfer devices 70, 72, 74, 76, 78 (C1-C5) are all friction clutches. However, other conventional clutch configurations may be employed, such as dog clutches, rocker clutches, and others recognizable to those having ordinary skill in the art. The clutches C1-C5 may be hydraulically actuated, receiving pressurized hydraulic fluid from a pump (not shown). Hydraulic actuation of clutches C1-C5 is accomplished, for example, by using a conventional hydraulic fluid control circuit, as will be recognized by one having ordinary skill in the art.

In the exemplary embodiment described herein, wherein the hybrid powertrain 10 is used as a land vehicle, the transmission output shaft 20 is operatively connected to the final drive system (or "driveline"). The driveline may include a front or rear differential, or other torque transfer device, which provides torque output to one or more wheels through respective vehicular axles or half-shafts (not shown). The wheels may be either front or rear wheels of the vehicle on which they are employed, or they may be a drive gear of a track vehicle. Those having ordinary skill in the art will recognize that the final drive system may include any known configuration, including front wheel drive (FWD), rear wheel drive (RWD), four-wheel drive (4WD), or all-wheel drive (AWD), without altering the scope of the claimed invention.

All of the planetary gear sets 24, 26, 28, as well as the first and second motor/generators 56, 58 (motor A and motor B,) are preferably coaxially oriented about the intermediate central shaft 36 or another axis. Motor A or motor B may take on an annular configuration, permitting one or both to generally circumscribe the three planetary gear sets 24, 26, 28. Such a configuration may reduce the overall envelope, i.e., the diametrical and longitudinal dimensions, of the hybrid transmission 14 are minimized.

The hybrid transmission 14 receives input motive torque from a plurality of torque-generative devices. "Torque-generative devices" include the engine 12 and the motors/generators 56, 58 as a result of energy conversion from fuel stored in a fuel tank or electrical potential stored in an electrical energy storage device (neither of which is shown).

The engine 12, motor A (56,) and motor B (58) may operate individually or in concert—in conjunction with the planetary gear sets and selectively-engageable torque-transmitting mechanisms—to rotate the transmission output shaft 20. Moreover, motor A and motor B are preferably configured to selectively operate as both a motor and a generator. For example, motor A and motor B are capable of converting electrical energy to mechanical energy (e.g., during vehicle propulsion), and further capable of converting mechanical energy to electrical energy (e.g., during regenerative braking or during periods of excess power supply from engine 12).

With continuing reference to FIG. 1, an electronic control apparatus (or "controller") having a distributed controller architecture is shown schematically in an exemplary embodiment as a microprocessor-based electronic control unit (ECU) 80. The ECU 80 includes a storage medium with a suitable amount of programmable memory, collectively represented at 82, that is programmed to include, without limitation, algorithm or method 100 of regulating operation of the multi-mode hybrid transmission, as will be discussed in further detail below with respect to FIG. 4.

The control apparatus is operable, as described hereinafter, to provide coordinated system control of the powertrain 10 schematically depicted and described herein. The constituent elements of the control apparatus may be a subset of an overall vehicle control system. The control system is operable to synthesize pertinent information and inputs, and execute control methods and algorithms to control various actuators to achieve control targets. The control system monitors target and parameters including, without limitation: fuel economy, emissions, performance, driveability, and protection of drivetrain hardware—such as, but not limited to, the engine 12, transmission 14, motor A, motor B, and final drive 16.

The distributed controller architecture (ECU 80) may include a Transmission Control Module (TCM), an Engine Control Module (ECM), a Transmission Power Inverter Module (TPIM), and a Battery Pack Control Module (BPCM). A Hybrid Control Module (HCP) may be integrated to offer overall control and coordination of the aforementioned controllers.

A User Interface (UT) is operatively connected to a plurality of devices (not shown) through which a vehicle operator typically controls or directs operation of the powertrain. Exemplary vehicle operator inputs to the user interface include an accelerator pedal, a brake pedal, transmission gear selector, vehicle speed cruise control, and other inputs recognizable to those having ordinary skill in the art.

Each of the aforementioned controllers communicates with other controllers, sensors, actuators, etc., via a control area network (CAN) bus or communication architecture. The CAN bus allows for structured communication of control parameters and commands between the various controllers. The communication protocol utilized is application-specific. For example, and without limitation, one useable communication protocol is the Society of Automotive Engineers standard J1939. The CAN bus and appropriate protocols provide for robust messaging and multi-controller interfacing between the aforementioned controllers, and other controllers providing functionality such as antilock brakes, traction control, and vehicle stability.

The engine control module is operatively connected to, and in communication with, the engine 12. The engine control module is configured to acquire data from a variety of sensors and control a variety of actuators of the engine 12 over a plurality of discrete lines. The engine control module receives an engine torque command from the hybrid control module, generates a desired axle torque, and an indication of actual engine torque, which is communicated to the hybrid control module. Various other parameters that may be sensed by the engine control module include engine coolant temperature, engine input speed to the transmission, manifold pressure, and ambient air temperature and pressure. Various actuators that may be controlled by the engine control module include, without limitation, fuel injectors, ignition modules, and throttle control modules.

The transmission control module is operatively connected to the transmission 14, and functions to acquire data from a variety of sensors and provide command signals to the transmission 14. Inputs from the transmission control module to the hybrid control module may include estimated clutch torques for each of the clutches C1-C5, and rotational speed of the transmission output shaft 20. Additional actuators and sensors may be used to provide additional information from the transmission control module to the hybrid control module for control purposes.

Each of the aforementioned controllers may be a general-purpose digital computer, generally including a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, including resident program instructions and calibrations stored in ROM and executed to provide the respective functions of each computer. Information transfer between the various computers may be accomplished using the aforementioned CAN.

In response to operator input, as captured by the user interface, the supervisory hybrid control module controller and one or more of the other controllers described above with respect to FIG. 1 determine required transmission output torque. Selectively operated components of the hybrid transmission 14 are appropriately controlled and manipulated to respond to the operator demand. For example, in the embodiment shown in FIG. 1, when the operator has selected a forward drive range and manipulates either the accelerator pedal or the brake pedal, the hybrid control module determines an output torque for the transmission, which affects how and when the vehicle accelerates or decelerates. Final vehicle acceleration is affected by other variables, including such factors as road load, road grade, and vehicle mass. The hybrid control module monitors the parametric states of the torque-generative devices, and determines the output of the transmission required to arrive at the desired torque output. Under the direction of the hybrid control module, the transmission 14 operates over a range of output speeds from slow to fast in order to meet the operator demand.

The ECU 80 also receives frequency signals from sensors for processing into input member 18 speed, $N_i$, and output member 20 speed, $N_o$, for use in the control of transmission 14. The system controller may also receive and process pressure signals from pressure switches (not shown) for monitoring clutch application chamber pressures. Alternatively, pressure transducers for wide range pressure monitoring may be employed. Pulse-width modulation (PWM) and/or binary control signals are transmitted by the controller 80 to transmission 14 for controlling fill and drain of clutches C1-C5 for application and release thereof.

Additionally, the controller 80 may receive transmission fluid sump temperature data, such as from thermistor inputs (not shown), to derive a sump temperature. Controller 80 may provide PWM signals derived from input speed, $N_i$, and sump temperature for control of line pressure via one or more regulators.

Fill and drain of clutches C1-C5 may be effectuated, for example, by solenoid controlled spool valves responsive to PWM and binary control signals. Trim valves may be employed using variable bleed solenoids to provide precise placement of the spool within the valve body and correspondingly precise control of clutch pressure during apply. Similarly, one or more line pressure regulators (not shown) may be utilized for establishing regulated line pressure in accordance with the control signal. Clutch slip speeds across clutches may be derived from, for example: transmission input speed, output speed, motor A speed, and/or motor B speed.

Figure 2:
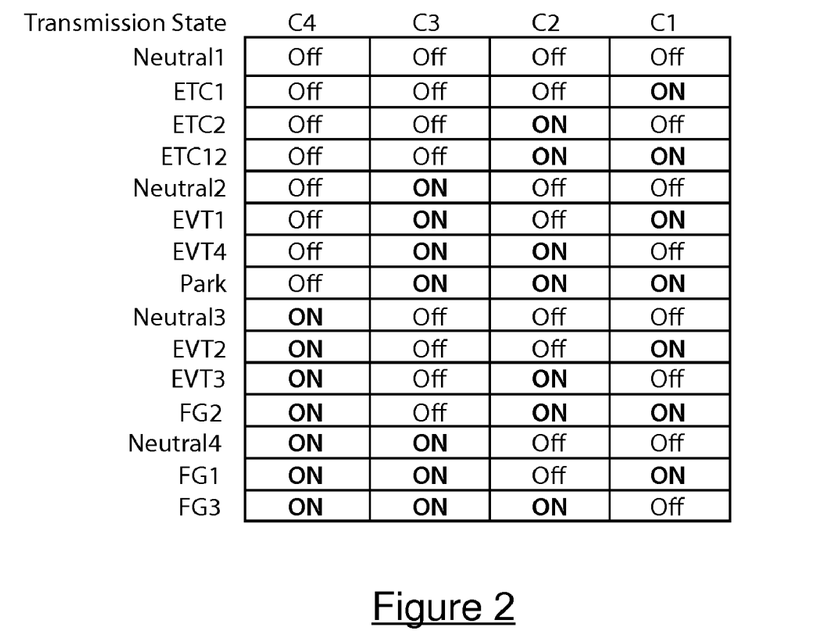
FIG. 2 is a truth table listing the engaged torque-transmitting mechanisms for each of the operating modes of the transmission illustrated in FIG. 1.

The multi-mode, electrically-variable, hybrid transmission 14 is configured for several transmission operating modes. The truth table provided in FIG. 2 presents an exemplary engagement schedule of the torque-transmitting mechanisms C1-C4 to achieve the array of operating states or modes. The various transmission operating modes described in the table indicate which of the specific clutches C1-C4 are engaged (actuated), and which are released (deactivated) for each of the operating modes.

In general, ratio changes in transmission 14 may be performed such that torque disturbances are minimized, and the shifts are smooth and unobjectionable to the vehicle occupants. Additionally, release and application of clutches C1-C4 should be performed in a manner which consumes the least amount of energy, and does not negatively impact durability of the clutches. One major factor affecting these considerations is the torque at the clutch being controlled, which may vary significantly in accordance with such performance demands as acceleration and vehicle loading. Improved shifts may be accomplished by a zero, or close to zero, reactive torque condition at the clutches at the time of application or release, which condition follows substantially zero slip across the clutch. Clutches having zero slip across the clutch may be referred to as operating synchronously.

Electrically-variable operating modes may be separated into four general classes: input-split modes, output-split modes, compound-split modes, and series modes. In an input-split mode, one motor/generator (such as either motor A or motor B) is geared such that its speed varies in direct proportion to the transmission output, and another motor/generator (such as the other of motor A or motor B) is geared such that its speed is a linear combination of the input and output member speeds. In an output-split mode, one motor/generator is geared such that its speed varies in direct proportion to the transmission input member, and the other motor/generator is geared such that its speed is a linear combination of the input member and the output member speeds. A compound-split mode, however, has both motor/generators geared such that their speeds are linear combinations of the input and output member speeds, but neither is in direct proportion to either the speed of the input member or the speed of the output member.

Finally, when operating in a series mode, one motor/generator is geared such that its speed varies in direct proportion to the speed of the transmission input member, and another motor/generator is geared such that its speed varies in direct proportion to the speed of the transmission output member. When operating in series mode, there is no direct mechanical power transmission path between the input and output members and therefore all power must be transmitted electrically.

In each of the four general types of electrically-variable operating modes indicated above, the speeds of the motors are linear combinations of the input and output speeds. Thus, these modes have two speed degrees of freedom (which may be abbreviated for simplicity as "DOF"). Mathematically, the torque (T) and speed (N) equations of this class of modes take the form:

$$\begin{bmatrix} T_a \\ T_b \end{bmatrix} = \begin{bmatrix} a_{1,1} & a_{1,2} \\ a_{2,1} & a_{2,2} \end{bmatrix} \begin{bmatrix} T_i \\ T_o \end{bmatrix} \text{ and } \begin{bmatrix} N_a \\ N_b \end{bmatrix} = \begin{bmatrix} b_{1,1} & b_{1,2} \\ b_{2,1} & b_{2,2} \end{bmatrix} \begin{bmatrix} N_i \\ N_o \end{bmatrix}$$

where a and b are coefficients determined by the transmission gearing. The type of EVT mode can be determined from the structure of the matrix of b coefficients. That is, if $b_{2,1}=b_{1,2}=0$ or $b_{1,1}=b_{2,2}=0$, the mode is a series mode. If $b_{1,1}=0$ or $b_{1,2}=0$, the mode is an input split mode. If $b_{2,1}=0$ or $b_{2,2}=0$, the mode is an output split mode. If each of $b_{1,1}$, $b_{1,2}$, $b_{2,1}$, and $b_{2,2}$ are nonzero, for example, the mode is a compound split mode.

An electrically-variable transmission may also contain one or more fixed-gear (FG) modes. In general, fixed-gear modes result from closing (i.e., actuating) one additional clutch than the number required to select an electrically-variable mode. In fixed-gear modes, the speed of the input and each motor are proportional to the speed of the output. Thus, these modes have only one speed degree of freedom. Mathematically, the torque and speed equations of this class of modes take the form:

$$[T_b] = \begin{bmatrix} a_{1,1} & a_{1,2} & a_{1,3} \end{bmatrix} \begin{bmatrix} T_a \\ T_i \\ T_o \end{bmatrix} \text{ and } \begin{bmatrix} N_a \\ N_b \\ N_i \end{bmatrix} = \begin{bmatrix} b_{1,1} & b_{1,2} & b_{1,3} \end{bmatrix} [N_o]$$

where a and b are again coefficients determined by the transmission gearing. If $b_{1,1}$ is nonzero, motor A can contribute to output torque during operation in the fixed-gear mode. If $b_{1,2}$ is nonzero, motor B can contribute to output torque during operation in the fixed-gear mode. If $b_{1,3}$ is nonzero, the engine can contribute to output torque during operation in the fixed-gear mode. If $b_{1,3}$ is zero, the mode is an electric-only fixed-gear mode.

An electrically-variable transmission may also be configured for one or more modes with three speed degrees of freedom. These modes may or may not include reaction torque sources such that the transmission is capable of producing output torque proportional to engine torque or motor torque. If a mode with three speed degrees of freedom is capable of producing output torque, the torques of the engine and any motor connected as a reaction to the engine torque will generally be proportional to the output torque. If a motor is not connected as a reaction to the engine torque, its torque can be commanded to control its speed independently of the transmission input and output speed.

In a mode with three speed degrees of freedom, it is generally not possible to easily control battery power independently of output torque. This type of mode produces an output torque which is proportional to each of the reacting torque sources in the system. The fraction of total output power provided by each of the three torque sources may be adjusted by varying the speeds of the motors and input. These modes are hereafter referred to as electric torque converter (eTC) modes in recognition of the fact that power flows to or from the energy storage device as a function of the output torque and the speed of the engine, output, and one of the motors. Mathematically, the torque and speed equations of this class of modes take the form:

$$\begin{bmatrix} T_a \\ T_b \\ T_i \end{bmatrix} = \begin{bmatrix} a_{1,1} & a_{1,2} & a_{1,3} \end{bmatrix} [T_o] \text{ and } [N_b] = \begin{bmatrix} b_{1,1} & b_{1,2} & b_{1,3} \end{bmatrix} \begin{bmatrix} N_a \\ N_i \\ N_o \end{bmatrix}$$

where a and b are coefficients determined by the transmission gearing. If $a_{1,1}$ is nonzero, motor A serves as a reaction member and its torque is proportional to output torque when operating in the eTC mode. If $a_{1,1}$ is zero, motor A is disconnected and its torque is not determined by the output torque. If $a_{1,2}$ is nonzero, motor B serves as a reaction member and its torque is proportional to output torque when operating in the eTC mode. If $a_{1,2}$ is zero, motor B is disconnected and its torque is not determined by the output torque. If $a_{1,3}$ is nonzero, the engine can contribute to output torque during operation in the fixed-gear mode. If $a_{1,3}$ is zero, the input is disconnected and its torque is not determined by the output torque. If all of $a_{1,1}$, $a_{1,2}$, and $a_{1,3}$ are zero, the mode is a neutral mode that is not capable of producing output torque.

There are four neutral modes presented in FIG. 2. In Neutral 1, all clutches are released. Neutral 1 may be utilized when the entire vehicle is stopped and in an off-state, and thus there is no power distribution, electrical, mechanical, or otherwise, being actively distributed throughout the powertrain 10. In Neutral 1, a 12-volt starting-lighting-and-ignition (SLI) battery may be used for engine start.

In Neutral 2, only clutch C3 is engaged, and motor A and motor B may react engine 12 for start or to charge the energy storage device. Similar to Neutral 2, when transmission 14 is in Neutral 3, motor A and motor B may react engine 12 for start or to charge the energy storage device, and clutch C4 as the only engaged torque-transmitting device. In Neutral 4, the third and fourth clutches C3, C4 are both in an activated state. In this instance, motor A is locked or "grounded", and motor B is geared with the engine 12 for engine start.

The first and second planetary gear sets 24, 26 cooperate with the first and second motor/generators 56, 58, along with the selective engagement of the first and second clutches C1, C2, to constitute an electric torque converter (eTC). For example, when the transmission 14 is operating in an eTC mode, the electric output of motor A and/or motor B, depending upon the active control schedule, can be adapted to control the transfer of torque from the engine 12 through the transmission differential gearing to the output member 20. When the vehicle is started, ETC1 Mode is established by engaging the first clutch C1. In ETC1 Mode, motor A reacts engine 12 with the first and third planetary gear sets 24, 28, and motor B freewheels. In ETC1 Mode, the stationary vehicle can be smoothly started with the engine 12 held at a suitable speed by gradually increasing the amount of electric power generated by motor A—i.e., the reaction force of motor A.

There are two other alternative eTC modes available utilizing the transmission configuration presented herein. ETC2 Mode, also known as "compound eTC", can be initiated by engaging clutch C2, and disengaging the remaining clutches. In ETC2 Mode, motor A reacts engine 12 with the first and third planetary gear sets 24, 28, while motor B reacts engine 12 and motor A to the output member 20. The distribution of engine torque is manipulated through the cooperative management of the amount of electric power output generated by motor A and motor B.

The third eTC mode, ETC12 Mode, can be initiated by engaging both clutch C1 and clutch C2. Similar to ETC1 Mode, motor A reacts the engine 12 with the first and third planetary gear sets 24, 28. However, in this instance, motor B is grounded to the transmission housing 60. In ETC12 Mode, the vehicle can be smoothly accelerated with the engine 12 held at a suitable speed by gradually increasing the reaction force generated by motor A; which may be proportional to the electric power generated by motor A.

When the engine 12 is in an off-state, the transmission 14 can utilize the eTC mode clutch control schedule to vary the amount of electric energy generated by motor A so as to gradually increase the drive torque of motor A and/or motor B. For example, if the transmission 14 is shifted into ETC1 Mode when the engine 12 is in an off-state, the engine 12 will create a reaction force, by way of input member 18. The motive output of the motor A can then be controlled, and a continuous and uninterrupted transmission output torque maintained, without having to turn the engine 12 on.

The exemplary powertrain 10 described herein has three fixed-gear (FG), or "direct," modes of operation. In all fixed-gear modes of this embodiment of transmission 14, the vehicle is driven in the forward direction by operation of the engine 12. The selective engagement of clutches C1, C3 and C4 shifts the transmission 14 into FG1 Mode. In FG1, motor A is grounded, and the engine drives the first planetary gear set 24 to the third planetary gear set 28 and, thus, the output member 20. FG2 Mode is achieved by the selective engagement of clutches C1, C2 and C4. In FG2, motor B is grounded, and the engine drives the first and second planetary gear sets 24, 26 to the third planetary gear set 28 and, thus, the output member 20. Likewise, FG3 Mode is achieved by the selective engagement of clutches C2, C3 and C4. In FG3, motor A is locked, and the engine drives the first planetary gear set 24 to the second and third planetary gear sets 26, 28 and the output member 20. When operating in a fixed-gear mode of operation, the output member speed $N_o$ is directly proportional to input member speed $N_i$ and the selected gear ratio. $N_i=N_o\times GR$.

With continued reference to FIG. 2, the transmission 14 may also operate in four electrically-variable transmission (EVT) modes. In EVT1 and EVT4, the transmission 14 is operating in an input-split mode of operation, wherein the output speed $N_o$ of the transmission 14 is proportional to the speed of one motor/generator 56, 58 (motor A or motor B). Specifically, EVT1 Mode is achieved through the selective engagement of the first and third clutches C1 and C3. When in EVT1, motor A functions to react the engine 12 with the first planetary gear set 24, to the third planetary gear set 28, and the output member 20; while motor B drives the second and third planetary gear sets 26, 28. Motor A propels the vehicle in EVT1. Alternatively, the transmission 14 may be selectively shifted into EVT4 Mode by actuating clutch C2 and clutch C3. In EVT4, motor A functions to react the engine 12 with the first planetary gear set 24, to the second and third planetary gear sets 26, 28, and the output member 20, while motor B drives the second and third planetary gear sets 26, 28. Motor B propels the vehicle in EVT4.

In EVT2 and EVT3, the transmission 14 is operating in a compound-split mode, wherein the output speed $N_o$ of the transmission 14 is not proportional to the speed of a single motor/generator, but is rather an algebraic linear combination of the speeds of both motor/generators. More particularly, EVT2 is achieved through the selective engagement of the first and fourth clutches C1, C4. In this mode, motor A and motor B operate to react the engine 12 with the first and second planetary gears sets. Alternatively, the transmission 14 may be selectively shifted into EVT3 Mode by actuating clutch C2 and clutch C4. When operating in EVT3 Mode, the two motor/generator assemblies 56, 58 react the engine 12 with all three planetary gear sets 24, 26, 28.

Figure 3:
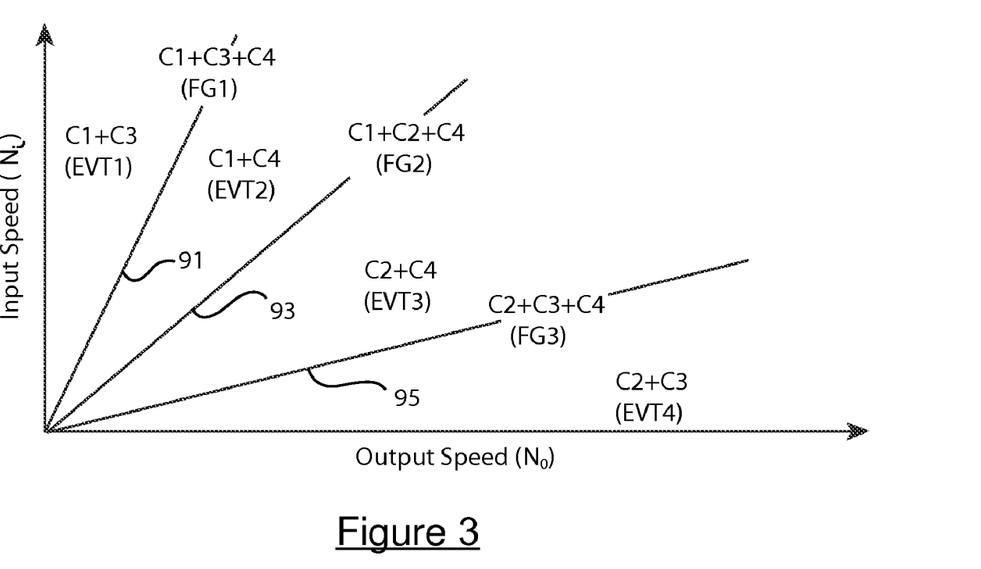
FIG. 3 is a graphical representation of various regions of operation with respect to input and output speeds of the transmission illustrated in FIG. 1.

With reference to FIG. 3, a plot of transmission output speed, $N_o$, along the horizontal axis versus input speed, $N_i$, across the vertical axis is illustrated. FIG. 3 is only a graphical representation of exemplary regions of operation for each operating mode with respect to input and output speeds of this embodiment of transmission 14.

Synchronous operation in FG1—the input speed and output speed relationships where clutches C1, C3 and C4 are operating with substantially zero slip speed thereacross—is represented by line 91. As such, line 91 represents an input and output speed relationship at which substantially synchronous shifting between EVT modes can occur. FG1 is also a range at which direct mechanical coupling from input to output can be effected by simultaneous application of clutches C1, C3 and C4—i.e., fixed- or direct-ratio.

Synchronous operation in FG2—the input speed and output speed relationships where clutches C1, C2 and C4 are operating with substantially zero slip speed thereacross—is represented by line 93. Similarly, the relationships between input and output speed during operation in FG3, whereat clutches C2, C3 and C4 are operating simultaneously with substantially zero slip speed thereacross, is represented by line 95.

To the left of the shift ratio line 91 is an exemplary region of operation for the first EVT mode, EVT1, wherein both C1 and C3 are applied, and C2 and C4 are released. To the right of the shift ratio line 91 and left of shift ratio line 93 is an exemplary region of operation for the second EVT mode, EVT2, wherein C1 and C4 are applied, and C2 and C3 are released.

To the right of shift line 93 and left of shift ratio line 95 is an exemplary region of operation for the third EVT mode, EVT3, wherein both C2 and C4 are applied, and C1 and C3 are released. To the right of the shift ratio line 95 is an exemplary region of operation for the fourth EVT mode, EVT4, wherein C2 and C3 are applied, and C1 and C4 are released. As used herein with respect to clutches C1-C5, the terms "applied" or "actuated" indicate substantial torque transfer capacity across the respective clutch. Antithetically, the terms "released" or "deactivated" indicate insubstantial or no torque transfer capacity across the respective clutch.

While the regions of operation specified above may be generally favored for operation of the hybrid transmission 14, it is not meant to imply that the various EVT regions of operation depicted in FIG. 3 cannot or do not overlap. Generally, however, it may be preferred to operate in the specified regions because each particular mode of operation preferably employs gear sets and motor hardware particularly well suited in various aspects (e.g., mass, size, cost, inertial capabilities, etc.) for that region. Similarly, while the individual regions of operation specified above are generally preferred for the particular modes of operation indicated, it is not meant to imply that the regions of operation for the individual EVT modes cannot be switched.

Generally, a shift into Mode 1 may be considered a downshift and is associated with a higher gear ratio in accordance with the relationship of $N_i/N_o$. In contrast, a shift into Mode 4 is considered an upshift, and is associated with a lower gear ratio in accordance with the relationship of $N_i/N_o$. As discussed herein, other mode-to-mode shift sequences are feasible. For example, a shift from EVT1 to EVT3 is also an upshift, while a shift from EVT4 to EVT2 is considered a downshift.

During operation of powertrain 10, an initiated shift sequence may be detected by the ECU 80 or hybrid control module. If a shift sequence is not initiated—for example, by operator command or change in vehicle operating conditions—the ECU 80 monitors the transmission 14 and will continue in its current state of operation. The requested shift sequence may be a multiple-shift maneuver, which includes an initial EVT mode, an intermediate EVT mode, and a target EVT mode.

Figure 4A:
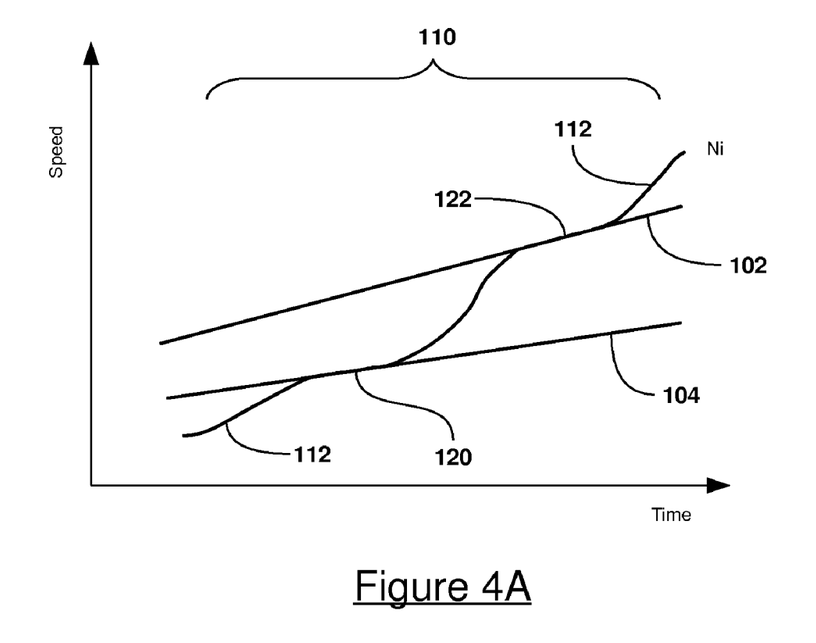
FIG. 4A is a schematic graphical representation of the speed profiles of a multiple-shift maneuver executed using fixed-gear ratios.
Figure 4B:
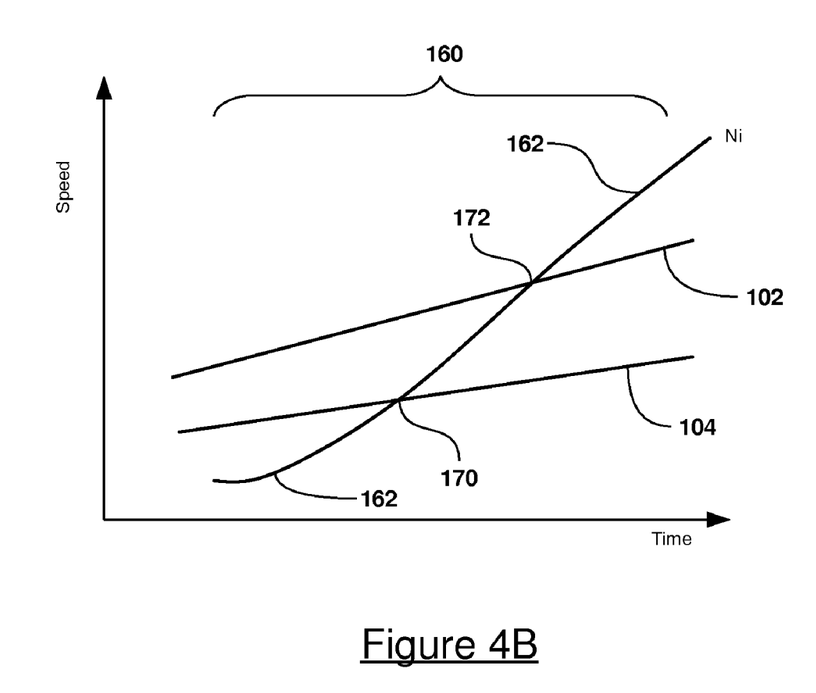
FIG. 4B is a schematic graphical representation of the speed profiles of a multiple-shift maneuver with a single input-speed profile.

Referring now to FIGS. 4A and 4B, the multiple-shift maneuver or event may occur in multiple ways. For example, the exemplary powertrain 10 shown in FIG. 1 is configured to perform the multiple-shift maneuver by transitioning through a fixed-gear mode, as shown in FIG. 4A. Alternatively, as described in more detail below, the multiple-shift maneuver may utilize quasi-asynchronous (QA) and electric torque converter (eTC) modes.

As shown in FIG. 4A, fixed-gear modes create a proportional, direct-drive relationship between the engine 12 and the final drive 16, determined by the gear ratio (GR) of the specific fixed gear. Therefore, transitioning through fixed-gear modes is available only if engine 12 is running. These proportional relationships are shown as lines 102 and 104 of FIG. 4A, representing respective fixed-gear modes. On lines 102 and 104, the relationship of input speed to output speed is: $N_i = N_o * GR$. If a multiple-shift maneuver is requested, the hybrid control module will determine if engine 12 is in an engine-on or engine-off state. If engine 12 is on, the hybrid control module will determine which shift sequence provides for more-optimal shifting under the current operating conditions.

FIG. 4A schematically shows a fixed-gear multiple-shift maneuver 110. The input speed profile, Ni, is shown on line 112. For illustrative purposes only, the fixed-gear multiple-shift maneuver 110 will be discussed herein with lines 102 and 104 representing FG1 and FG2, respectively. The fixed-gear multiple-shift maneuver 110, therefore, represents—as the input speed moves from left to right—shifts from EVT3 to EVT2, through FG2, and from EVT2 to EVT1, through FG1.

During the fixed-gear multiple-shift maneuver 110, as input speed passes through the fixed-gear modes, the input speed, line 112, dwells on the corresponding fixed ratios. These fixed-gear dwell portions 120 and 122, corresponding to FG2 and FG1, respectively, cause inflection points in the line 112. More importantly, the fixed-gear dwell portions 120 and 122 are likely felt by the vehicle operator as changes in vehicle acceleration, sound, or driving feel.

FIG. 4B schematically shows a single-staged multiple-shift maneuver 160. Unlike the fixed-gear multiple-shift maneuver 110 shown in FIG. 4A, the single-staged multiple-shift maneuver 160 does not dwell on the fixed-gear ratios as input speed, shown on line 162, passes lines FG2 and FG1, lines 102 and 104, respectively. As input speed increases, the transmission 14 shifts from the initial EVT mode to the intermediate EVT mode and to the target EVT mode. The single-staged multiple-shift maneuver 160 uses transitional shift events 170 and 172 to maintain a smooth, single-staged input speed profile. The input speed line 162 does not dwell on the fixed-gear ratios and the vehicle operator feels, at most, only a single shift.

In the corresponding example provided for the fixed-gear multiple-shift maneuver 110, the single-staged multiple-shift maneuver 160 may shift from EVT3 (initial mode) to EVT2 (intermediate mode) and from EVT2 to EVT1 (target mode). Those having ordinary skill in the art will recognize that the modes (initial mode, intermediate mode, and target mode) may also be referred to as first, second, and third EVT modes. The important thing is that the transmission 10 shift through three individual EVT modes along the single-staged input speed profile. As described in more detail below, this specific single-staged multiple-shift maneuver 160 may utilize a QA shift for transitional shift event 170 and an eTC shift for transitional shift event 172. Those having ordinary skill in the art will also recognize that, although FIGS. 4A and 4B demonstrate a downshift, the control methods described herein may be applied to an upshift (e.g. EVT1-EVT2-EVT3).

Figure 5:
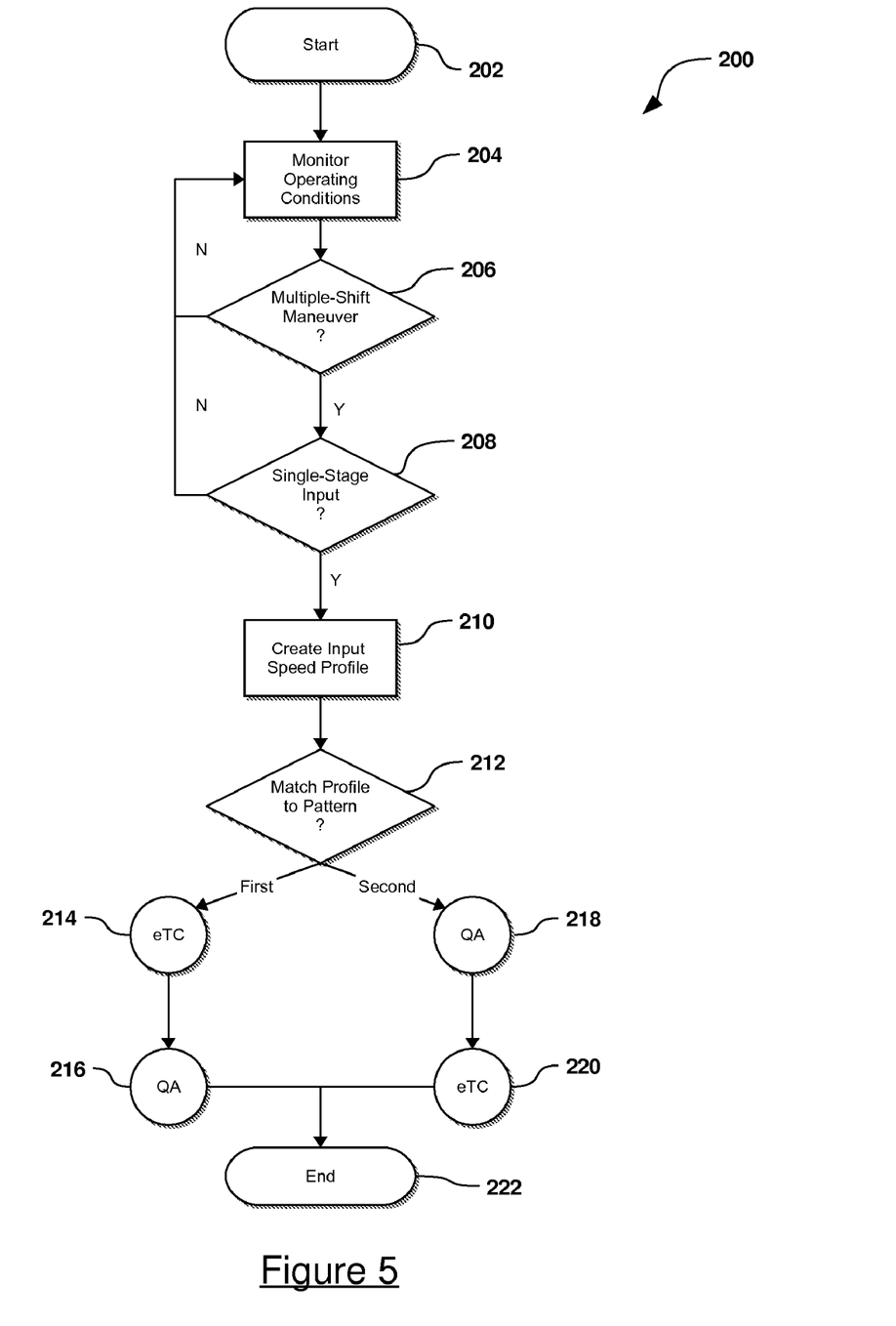
FIG. 5 is a schematic flow chart illustrating a control method for executing the multiple-shift maneuver with the single input-speed profile in accordance with the claimed invention.

Referring now to FIG. 5, and with continued reference to FIGS. 1-4B, there is shown a schematic flow chart of a control method 200 for executing a multiple-shift maneuver, such as the single-staged multiple-shift maneuver 160 shown in FIG. 4B. Method 200 begins at a start or initiation step 202, which may coincide with vehicle ignition (which may not include actual ignition of the engine 12) or another starting event. The method 200 monitors operating conditions of the powertrain 10 and transmission 14 in step 204.

The method or algorithm 200 is described herein with respect to the structure illustrated in FIG. 1, preferably executed as algorithms in the controllers of the control system described above, to control operation of the system described with reference to FIG. 1. However, those having ordinary skill in the art will recognize that the present invention may also be incorporated into other powertrain arrangements without departing from the intended scope of the claimed invention.

The ECU 80 or hybrid control module may determine that a multiple-shift maneuver is needed in step 206. For purposes of the method 200, the multiple-shift maneuver again includes an initial EVT mode, intermediate EVT mode, and target EVT mode. The method 200 includes determining whether a single-staged input profile is needed in step 208, as opposed to executing the fixed-gear multiple-shift maneuver 110 shown in FIG. 4A. When the method 200 determines either that the multiple-shift maneuver is not required or that the single-staged input profile is not required, the method 200 reverts to monitoring operating conditions at step 204.

If needed, the method 200 creates the single-staged input speed profile, such as the input speed profile shown on line 162 of FIG. 4B, in step 210. At step 212, method 200 selects a shift pattern to match the single-staged multiple-shift maneuver 160 to the input speed profile created in step 210. A first multiple-shift pattern involves first utilizing the eTC transitional shift event in step 214 followed by the QA transitional shift event in step 216. A second multiple-shift pattern involves first utilizing the QA transitional shift event in step 218 followed by the eTC transitional shift event in step 220.

For the exemplary single-staged multiple-shift maneuver 160 shown in FIG. 4B and discussed above. The multiple-shift maneuver involves shifting from EVT3 to EVT2 with the QA shift for transitional shift event 170 and shifting from EVT2 to EVT1 with the eTC shift for transitional shift event 172. Therefore, for this exemplary maneuver, the method 200 would select the second multiple-shift pattern and steps 218 and 220.

Both the first multiple-shift pattern and the second multiple-shift pattern are characterized by a lack of fixed-gear propulsion during the initial EVT mode, the intermediate EVT mode, and the target EVT mode. Execution of the eTC transitional shift event and QA transitional shift event are described in more detail below with regard to FIGS. 6 and 7.

Figure 6:
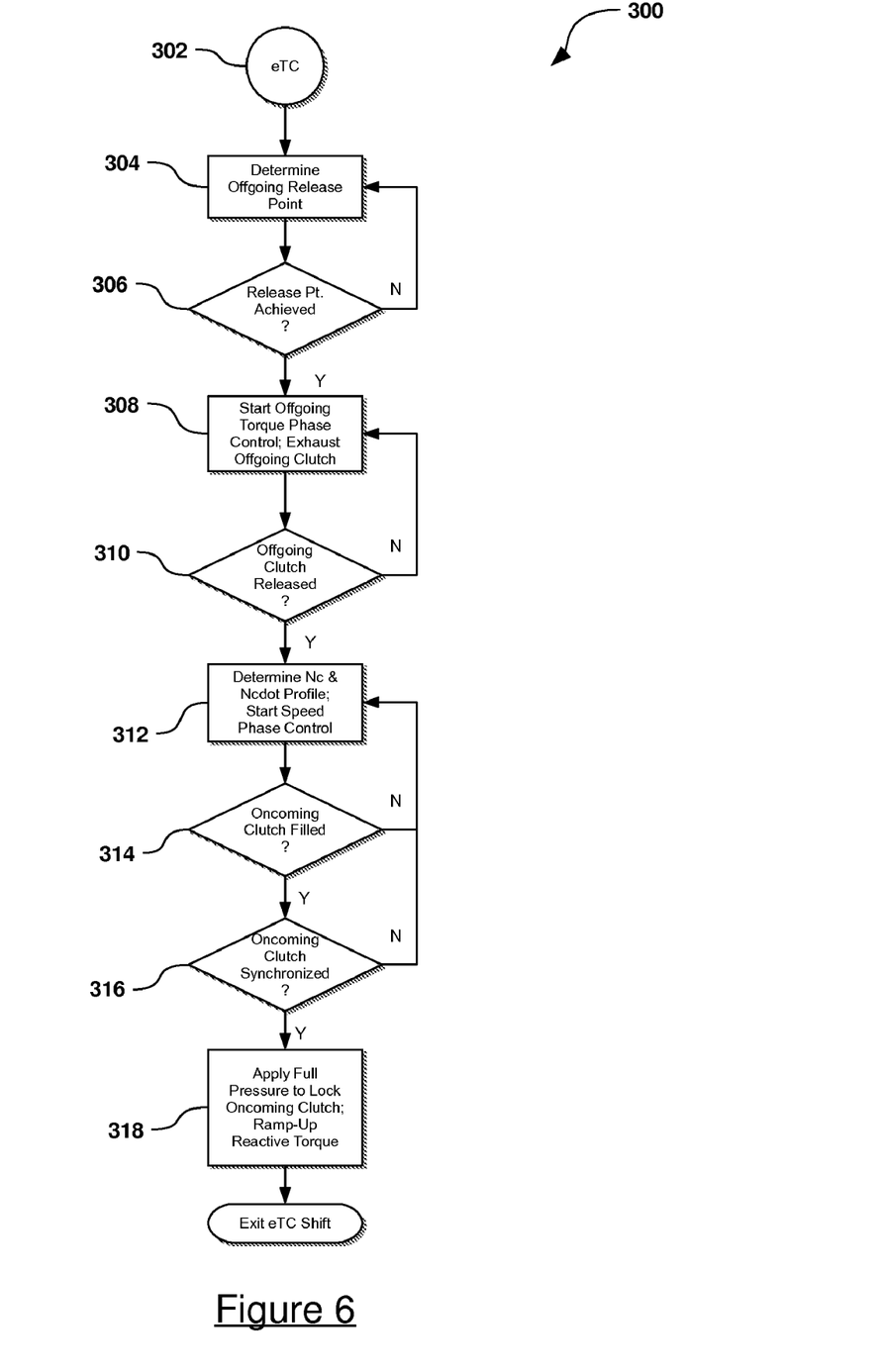
FIG. 6 is a schematic flow chart illustrating the electric torque converter transitional shift event in detail.

Referring now to FIG. 6, and with continued reference to FIGS. 1-5, there is shown an eTC method 300 of executing an eTC transitional shift event. The eTC method 300 is a more-detailed process showing the control method for either of steps 214 or 220 in the method 200 of FIG. 5.

For illustrative purposes, the eTC method 300 will be described in relation to an EVT2-to-EVT1 downshift, generally corresponding to step 220 of FIG. 5 and transitional shift event 172 of FIG. 4B. Step 220 forms part of the second shift pattern selected by step 212 of FIG. 5. Therefore, EVT2 is the intermediate mode for the single-staged multiple-shift maneuver 160 and EVT1 is the target (or final) mode. Note however, that the eTC method 300 may be used for other mode-to-mode shifts.

The eTC method 300 is described herein with respect to the structure illustrated in FIG. 1. However, those having ordinary skill in the art will recognize that the present invention may also be incorporated into other powertrain arrangements without departing from the intended scope of the claimed invention.

The exemplary EVT2-to-EVT1 shift begins with clutches C4 and C1 engaged and finishes with clutches C3 and C1 engaged (as shown in FIG. 2). Therefore, C4 is the offgoing clutch and C3 is the oncoming clutch. The eTC method 300 begins at step 302 as the eTC transitional shift event is initiated and the hybrid control module (or other portion of the control architecture of powertrain 10) determines the offgoing clutch C4 release point in step 304, which may coincide with the slip speed of oncoming clutch C3 reaching zero.

The eTC method 300 may optionally begin pre-filling (not shown) the oncoming clutch associated with the target EVT mode to a predetermined pre-fill level. The clutch volume for the oncoming clutch mechanism, C3, can be filled to 80-90% without reaching torque capacity or causing an inordinate amount of slip, which may otherwise interfere with the current operating mode. This pre-fill strategy may shorten the shift time of the eTC transitional shift event by reducing sequential fill times.

At step 306 the eTC method 300 determines whether or not the target release point of the offgoing clutch C4 has been reached. Once the release point of C4 is reached, the eTC method 300 proceeds to step 308. Otherwise, eTC method 300 returns to step 304 to again determine the release point of C4. Optionally (not shown), the eTC method 300 may include a break or abort command to shift transmission 14 to another operating mode based upon changing conditions.

At step 308, the eTC method 300 begins torque control of the offgoing clutch C4 and unloads C4 by exhausting fluid from the clutch piston. Step 310 verifies that C4 has released (i.e., is not carrying torque). If C4 has not yet released, eTC method 300 continues torque control and offloading C4 (in step 308) until step 310 verifies that C4 is released.

In step 312, the method determines $N_c$ and $N_{c\_dot}$ (the first time derivative of $N_c$) profiles and start speed phase control of oncoming clutch C3. Speed phase control begins to synchronize C3 by moving slip speed, $N_c$, toward zero. Determining $N_{c\_dot}$ will allow the eTC method 300 to calculate the time it will take to control the slip speed $N_c$ from its current level to zero, and therefore synchronize C3.

The eTC method 300 commands and monitors C3 clutch fill level in step 314. If oncoming clutch C3 is filled, the eTC method 300 determines whether C3 is synchronized in step 316. If C3 is not filled or synchronized, the eTC method 300 returns to speed phase control in step 312 until C3 is filled and synchronized.

After oncoming clutch C3 is synchronized, full pressure is applied to C3 in step 318. Applying full pressure to the piston of C3 acts to lock C3 and begin torque transfer thereacross. Once C3 is locked, the eTC method 300 may also ramp up reactive torque limits across C3. Locking C3 places the transmission 14 in EVT1 mode, completing the eTC transitional shift event 172. The eTC method 300 is then complete and exits, either to end the multiple-shift event (step 222 in FIG. 5) or to proceed to the QA transitional shift event (step 216 in FIG. 5).

Note that the synchronous disengagement of offgoing clutch C4 followed by the synchronous engagement of oncoming clutch C3 both occur while the speed of motor A, $N_A$, is at or near zero. Near-zero $N_A$ allows transmission 14 to balance battery power against power output, even while increasing or decreasing input speed $N_I$. Furthermore, the transmission 14 may continuously produce an output torque when transitioning from EVT2 mode to EVT1 mode.

Figure 7:
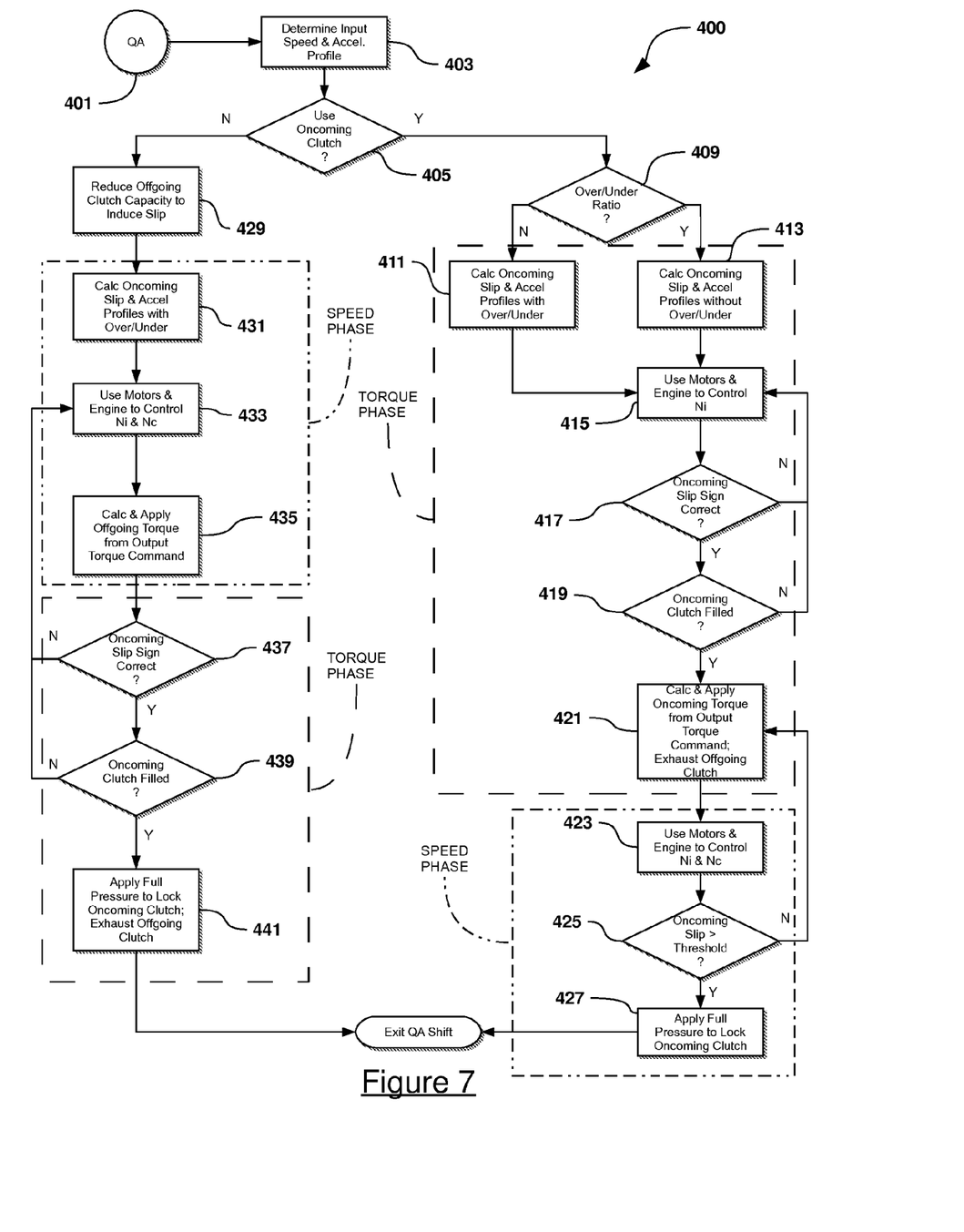
FIG. 7 is a schematic flow chart illustrating the quasi-asynchronous transitional shift event in detail.

With reference now to the flow chart shown in FIG. 7, and with continued reference to FIGS. 1-6, there is shown a QA method 400 of executing QA transitional shift event. The QA method 400 is a more-detailed process showing the control method for either of steps 216 or 218 in the method 200 of FIG. 5. Asynchronous shifting may be characterized in that the relative slip across the at least one of the offgoing and oncoming clutches is not equal to zero throughout the entire shift operation. Furthermore, at least one of the oncoming and offgoing clutches is carrying torque while being controllably slipped during the shift operation.

For illustrative purposes, the QA method 400 will be described in relation to an EVT3-to-EVT2 downshift, generally corresponding to step 218 of FIG. 5 and transitional shift event 170 of FIG. 4B. Step 218 forms part of the second shift pattern selected by step 212 of FIG. 5. Therefore, EVT3 is the initial mode for the single-staged multiple-shift maneuver 160 and EVT2 is the intermediate mode. Note however, that the QA method 400 may be used for other mode-to-mode shifts.

The QA method 400 is described herein with respect to the structure illustrated in FIG. 1. However, those having ordinary skill in the art will recognize that the present invention may also be incorporated into other powertrain arrangements without departing from the intended scope of the claimed invention.

The QA method 400 begins at step 401 as the QA transitional shift event is initiated and the hybrid control module (or other portion of the control architecture of powertrain 10) determines input speed and acceleration profiles at step 403. The input speed and acceleration profiles may generally be derived from the single-staged input speed profile 162 (shown in FIG. 4B) created in step 210 (shown in FIG. 5). Based on the initial and target speeds of the oncoming clutch, as well as certain calibrations that characterize the "deflection points" of the profile.

Prior to, contemporaneous with, or subsequent to steps 401 and 403, the controller will determine, at step 405, if the QA transitional shift event is preferably completed using the oncoming clutch C1 or the offgoing clutch C2. There are two ways to perform the quasi-asynchronous shift: using the oncoming clutch C1 or the offgoing clutch C1. Each option has certain advantages and disadvantages. Optionally, the controller may command fluid be distributed to the oncoming clutch C1, pre-filling C1 to a predetermined pre-fill level, which is less than the level necessary to achieve full torque capacity.

If decision step 405 determines that the QA transitional shift event will be completed using the oncoming clutch C1, then step 409 will determine if an over/under ratio is needed. Over/under ratio is where the engine speed is increased or decreased to over or under the target gear ratio, respectively. In one example of an under ratio, if the target gear ratio is 1.00 and the output speed is 1000 rpm, the target engine speed would be 1000 rpm. The engine speed is brought from 2000 to 800 rpm on an upshift and therefore moves under the target ratio. In the same example, if the input speed is brought from 800 to 1200 rpm for the upshift, it is considered an over ratio.

The over/under ratio may be needed, for example, if the shift operation is a power-on downshift using the oncoming clutch C1. In contrast, under a power-on case (i.e., positive output torque and no regenerative braking) in which the oncoming clutch C1 is used for completing the upshift, no under ratio is needed. The over ratio is needed in the power-on downshift case because oncoming clutch C1 will only produce positive output torque during the under-ratio period. If the offgoing clutch C2 is used to complete the QA transitional shift event, then the case is just the opposite.

Performing a clutch-to-clutch shift may occur in two distinct phases: a torque phase and a speed phase. The torque phase refers to the time during which the offgoing clutch is unloaded and released. The speed phase refers to the period during which the certain member speed of one of the members is controlled from the old speed target toward the new speed target, with the use of the oncoming or offgoing clutch and other torque generative devices, such as engine 12 or motors A or B. Speed phase may include control of either or both of the input speed, $N_i$, and clutch slip speed, $N_c$, profiles.

Once it is determined whether the over/under ratio is needed, the shift operation enters into the torque phase, and the QA method 400 will then determine the slip speed and acceleration profiles of the oncoming clutch C1 in either step 411 or step 413. If an over/under ratio is needed, the oncoming clutch C1 slip speed and acceleration profiles are determined based, in part, on the over/under ratio, as indicated in step 411. For example, the oncoming clutch slip speed profile is first targeted to a slip speed equivalent of the over/under ratio speed, and thereafter retargets to zero to engage the oncoming clutch when clutch torque is to be exchanged between the oncoming and offgoing clutch. However, if the over/under ratio is not needed, the QA method 400 proceeds to step 413, and the oncoming clutch slip and acceleration profiles are determined without the over/under ratio.

In step 415, the torque-generative devices of powertrain 10, which include the engine 12 and the motors A and B, are used to control the input speed. In steps 417 and 419, the system controller will determine if the slip sign of the oncoming clutch C1 is correct. Step 419 will determine whether C1 is filled, and therefore ready for full engagement and full torque transfer. The slip sign of C1 is deemed correct if the sign of the output torque command is the same as the oncoming clutch slip sign.

Clutch torque and clutch slip always have the same sign (i.e., either both positive or both negative), and the transfer function between clutch torque and output torque has a fixed relationship. Therefore, if the output torque command is positive, and the transfer function has a positive coefficient, a positive clutch torque will produce positive output torque. If steps 417 or 419 return a negative signal—i.e., the oncoming clutch slip sign is incorrect or the apply chamber of C1 is not filled, the system will revert back to step 415 and adjust input speed until steps 417 and 419 return positive signals.

If the oncoming clutch C1 is filled, and the controller can ascertain that the slip sign is correct, step 421 of the QA method 400 will calculate and apply the oncoming clutch (C1) torque based on the output torque command, and then complete the torque phase of the shift sequence by exhausting the offgoing clutch. Because the transfer function between oncoming clutch (C1) torque to output torque is fixed, once output torque command is known, the torque for oncoming clutch C1 can be determined.

The QA method 400 then transitions into the speed phase. In step 423, the powertrain torque generative devices are used to control the transmission input speed, $N_i$, and the speed of oncoming clutch C1 by adjusting torque input from the engine 12, motor A, motor B, or combinations thereof. In step 425, the system will monitor, sense, or otherwise determine if the amount of slip of oncoming clutch C1 is less than a predetermined slip threshold. If the oncoming clutch slip is less than the slip threshold, the controller will respond by locking C1 at step 427, and then exiting the QA method 400.

Torque exchange between the oncoming clutch C1 and offgoing clutch C2 occurs as the torque capacity of oncoming clutch C1 is increased by increasing hydraulic pressure thereto. Torque contributions of Motors A and B are reduced as the magnitude of reactive torque of the oncoming clutch C1 increases, and the system transitions the target EVT mode.

The QA transitional shift events described may be characterized as a quasi-asynchronous shift because the slip speed across at least one of the oncoming and offgoing clutches is non-zero throughout substantially the entire transitional shift event. Furthermore, at least one of the oncoming and offgoing clutches is carrying torque while being controllably slipped during the shift operation. As such, the input speed on line 162 of FIG. 4B will not dwell on any of the fixed gear ratios, such as lines 102 and 104. Ideally, the slip speed across the oncoming and offgoing clutches is controlled by adjusting input torque from either the engine 12 or one of the motors A and B.

If it is determined in step 405 that the QA transitional shift event is will use the offgoing clutch C2 to complete the shift, the QA method 400 proceeds to step 429. When using the offgoing clutch C2, the speed phase occurs first and the oncoming clutch C1 comes on during the torque phase. Accordingly, the offgoing clutch C2 must be controllably slipped prior to synchronizing the oncoming clutch C1, as indicated at 429. Optionally, the oncoming clutch C1 may be pre-filled to a predetermined pre-fill level, which is less than that to achieve full torque capacity or clutch slippage. Concurrently therewith, the offgoing clutch C2 may be slipped by controlling the torque capacity of C2 to below the reactive torque.

Offgoing clutch C2 is controllably slipped by reducing torque capacity by reducing hydraulic pressure in the clutch fill-chamber of C2. As torque capacity is reduced, it becomes equal to the magnitude of reactive torque of clutch C2. Reactive torque is commonly defined as a magnitude of torque transmitted through a torque-transfer device. Torque capacity is commonly defined as a maximum amount of torque transmissible across a clutch, and is generally based upon the magnitude of clutch pressure and clutch friction. When the magnitude of clutch torque exceeds the torque capacity, clutch slip occurs. The reactive torque is always less than or equal to the torque capacity. Clutch pressure is created by controlling the magnitude of hydraulic pressure applied to the clutch by the hydraulic circuit of the transmission.

In order to reduce reactive torque to the offgoing clutch C2 without adversely affecting torque output of the powertrain 10, the controller transfers sufficient energy to motors A and B such that their outputs torque are equal to the decrease in reactive torque across the offgoing clutch C2, and thus able to maintain the output torque at shaft 20 of the transmission 14. The torque output of motors A and B may then be concurrently increased with continued decrease in torque capacity and reactive torque of offgoing clutch C2. When C2 starts to slip, the reactive torque is the same as clutch capacity torque, and the output torque has a fixed ratio to the reactive torque, or capacity torque of the off going clutch C2.

Once the offgoing clutch C2 is slipped, the QA method 400 will enter the speed phase. In step 431, similar to step 413 described above, the slip speed and acceleration profiles of the oncoming clutch C1 are determined. Ideally, if the shift operation is completed using the offgoing clutch, the transmission input speed, $N_i$, and slip speed of oncoming clutch C1 are modified prior to exhausting the offgoing clutch C2, as indicated in step 433. This is in contrast to the order presented in steps 409-427, using the oncoming clutch C1 to complete the shift, in which the transmission input speed and oncoming clutch speed are modified after exhausting the offgoing clutch C2.

In step 435, the QA method 400 calculates and applies the offgoing clutch torque based on the output torque command, in a manner similar to that described above with respect to step 421. In contrast to step 421, however, step 435 completes the speed phase, and therefore does not include exhausting the offgoing clutch C2. Subsequently, the shift sequence enters into the torque phase. In steps 437 and 439, the QA method 400 will determine if the slip sign oncoming clutch C1 is correct and whether the oncoming clutch C1 is filled. If so, the QA method 400 will lock the oncoming clutch C1 and exhaust the offgoing clutch C2 in step 441. and thereafter exit the shift sequence.

Referring again to FIGS. 4B and 5, completion of both the QA transitional shift event 170 and the eTC transitional shift event 172 completes the single-staged multiple-shift maneuver 160. The transmission 14 has been shifted from the initial EVT mode (EVT3) to the intermediate EVT mode (EVT2) with the QA transitional shift event 170. The transmission 14 was then shifted from the intermediate EVT mode (EVT2) to the target EVT mode (EVT1) with the eTC transitional shift event 172. Furthermore, these two shifts have occurred along a single-staged input profile 162 and the vehicle driver and occupants may not have sensed more than a single shift.

While the best modes and other modes for carrying out the present invention have been described in detail, those familiar with the art to which this invention pertains will recognize various alternative designs and embodiments for practicing the invention within the scope of the appended claims.

The invention claimed is:

1. A method of performing shifts in hybrid powertrains configured for operation in multiple electrically variable transmission modes (EVT) and having an internal combustion engine, a first electric machine, and a second electric machine, the method comprising:
    determining whether a multiple-shift maneuver is needed, wherein said multiple-shift maneuver includes an initial EVT mode, an intermediate EVT mode, and a target EVT mode;
    determining whether a single-staged input profile is needed to execute said multiple-shift maneuver;
    creating said single-staged input speed profile;
    matching said single-staged input speed profile with one of a first multiple-shift pattern and a second multiple-shift pattern, wherein both of said multiple-shift patterns are characterized by a lack of fixed-gear propulsion during said multiple-shift maneuver;
    performing one of said first and second multiple-shift patterns by utilizing both a quasi-asynchronous transitional shift event and an electric torque converter transitional shift event;
    wherein said quasi-asynchronous transitional shift event utilizes a first oncoming clutch and a first offgoing clutch, and includes:
        inducing controlled slip to the first offgoing clutch,
        providing reaction torque from at least one of the electric machines,
        offloading torque from the first offgoing clutch in proportion to the provided reaction torque of the electric machines, and
        beginning slipping-engagement of the first oncoming clutch prior to completing offloading of the first offgoing clutch, wherein at least one of the first offgoing clutch and the first oncoming clutch is characterized by non-zero slip speed throughout the duration of the shift event;
    wherein said electric torque converter transitional shift event utilizes a second oncoming clutch and a second offgoing clutch, and includes:
        completely offloading the second offgoing clutch,
        controlling output torque of the transmission with at least one of the electric machines,
        synchronizing the second oncoming clutch, and
        engaging the second coming clutch; and
    wherein performing one of said first and second multiple-shift patterns is characterized by a lack of fixed-gear propulsion.

2. The method of claim 1, wherein said multiple-shift maneuver is a downshift.

3. The method of claim 2, wherein said first multiple-shift pattern includes first utilizing the electric torque converter transitional shift event and then utilizing the quasi-asynchronous transitional shift event.

4. The method of claim 2, wherein said second multiple-shift pattern includes first utilizing the quasi-asynchronous transitional shift event and then utilizing the electric torque converter transitional shift event.

5. The method of claim 1, wherein said multiple-shift maneuver is an upshift.

6. The method of claim 5, wherein said second multiple-shift pattern includes first utilizing the quasi-asynchronous transitional shift event and then utilizing the electric torque converter transitional shift event.

7. A method of performing shifts in hybrid powertrains configured for operation in multiple electrically variable transmission modes (EVT) and having an internal combustion engine, a first electric machine, and a second electric machine, the method comprising:
determining whether a multiple-shift maneuver is needed, wherein said multiple-shift maneuver includes an initial EVT mode, an intermediate EVT mode, and a target EVT mode;
determining whether a single-staged input profile is needed to execute the multiple-shift maneuver;
creating said single-staged input speed profile;
matching said single-staged input speed profile with a multiple-shift pattern characterized by a lack of fixed-gear propulsion throughout the duration of said multiple-shift maneuver;
performing said multiple-shift pattern by first utilizing a quasi-asynchronous transitional shift event and then utilizing an electric torque converter transitional shift event;
wherein said quasi-asynchronous transitional shift event utilizes a first oncoming clutch and a first offgoing clutch, and includes:
inducing controlled slip to the first offgoing clutch,
providing reaction torque from at least one of the electric machines,
offloading torque from the first offgoing clutch in proportion to the provided reaction torque of the electric machines, and
beginning slipping-engagement of the first oncoming clutch prior to completing offloading of the first offgoing clutch, wherein at least one of the first offgoing clutch and the first oncoming clutch is characterized by non-zero slip speed throughout the duration of the shift event;
wherein said electric torque converter transitional shift event utilizes a second oncoming clutch and a second offgoing clutch, and includes:
completely offloading the second offgoing clutch,
controlling output torque of the transmission with at least one of the electric machines,
synchronizing the second oncoming clutch, and
engaging the second coming clutch; and
wherein performing one of said first and second multiple-shift patterns is characterized by a lack of fixed-gear propulsion.

* * * * *